United States Patent [19]

Platz et al.

[11] Patent Number: 5,085,889

[45] Date of Patent: Feb. 4, 1992

[54] PROCESS FOR THE PREPARATION OF MAGNETIC PARTICLE DISPERSIONS USING BALL MILLS AND GRINDING MEDIA

[75] Inventors: Horst Platz, Willstaett; Peter Engelhardt, Plankstadt; Friedrich Sommermann, Kehl; Albert Kohl, Laumersheim; Juergen Klausmann, Offenburg; Reinhold Baur, Ortenberg; Peter Heilmann, Bad Duerkheim; Hermann Roller, Ludwigshafen, all of Fed. Rep. of Germany

[73] Assignee: BASF Aktiengesellschaft, Ludwigshafen, Fed. Rep. of Germany

[21] Appl. No.: 494,475

[22] Filed: Mar. 16, 1990

[30] Foreign Application Priority Data

Apr. 13, 1989 [DE] Fed. Rep. of Germany ....... 3912082

[51] Int. Cl.$^5$ ...................... G11B 23/00; B02C 17/00

[52] U.S. Cl. .................................. 427/128; 428/402; 428/694; 428/900; 252/62.54

[58] Field of Search .......................... 427/128; 241/5; 428/900, 694

[56] References Cited

U.S. PATENT DOCUMENTS 4,285,825  8/1981  Isobe et al. ...................... 252/62.54
4,775,553 10/1988  Kovacs et al. ...................... 427/128

Primary Examiner—Merrell C. Cashion, Jr.
Assistant Examiner—Stevan A. Resan
Attorney, Agent, or Firm—Keil & Weinkauf

[57] ABSTRACT

Magnetic recording media are produced by dispersion of powdered magnetic material in a mixture of solvents, organic polymer binders, dispersants and further conventional additives in a stirred ball mill and subsequent aftertreatment in a ball mill containing grinding media, application of the resulting dispersion as a layer to a substrate and subsequent consolidation of the layer.

4 Claims, No Drawings

PROCESS FOR THE PREPARATION OF MAGNETIC PARTICLE DISPERSIONS USING BALL MILLS AND GRINDING MEDIA

The present invention relates to a process for the production of magnetic recording media by dispersing powdered magnetic material with the aid of conventional dispersing apparatuses in a mixture of solvents, organic polymer binders, dispersants and other conventional additives, applying the resulting dispersion as a layer to a substrate and subsequently consolidating the layer.

The preparation of dispersions containing powdered magnetic material in the production of magnetic recording media is known. These dispersions consist of a powdered magnetic material, a solvent or solvent mixture, one or more organic polymers or prepolymers which are soluble or dispersible in this solvent (solvent mixture), dispersants and further organic and/or inorganic additives, such as lubricants, viscosity regulators, stabilizers, inert inorganic substances for regulating the conductivity, the abrasion, the roughness, etc. The preparation of the dispersions from the stated components is carried out in dispersing apparatuses, generally referred to as mills, with the aid of which the powdered materials are separated substantially into their individual particles and coated with the binder and/or wetting agent, by the action of a shear gradient which, depending on the design of the mill, ranges from medium to high. Depending on the method of preparation and on the subsequent processing of the magnetic powder materials, agglomerates composed of individual particles and having very different secondary particle diameters are formed. For the production of high quality magnetic recording media, however, it is necessary for the generally acicular magnetic particles to be present as substantially uniformly shaped individual particles, equal distances apart, in a predetermined preferential direction corresponding to the recording direction, the very small voids being filled with binder and having no air or other foreign materials as inclusions.

In accordance with these requirements, dispersing should be carried out under mild conditions, i.e. during the dispersing process in ball mills, tubular ball mills, stirred ball mills or kettles substantially so that the agglomerates are destroyed without the individual needles being fractured.

The constant requirement for higher recording densities maximum electroacoustic and video and audio properties in conjunction with lower and lower thicknesses of the magnetic layers demands homogeneous extremely smooth surfaces of the recording media and, to achieve this, complete and careful division of the magnetic pigment agglomerates. To achieve this in an economically acceptable time, dispersing apparatuses having a higher local energy density, for example stirred ball mills, planetary ball mills, sand mills or attrition mills, are used, as described in, for example, DE-A 35 26 415.

However, the known dispersing processes have a particular disadvantage. By introducing very high energy densities and using grinding media having a diameter of from 0.2 to 4.0 mm, usually from 0.6 to 2.0 mm, the pigment agglomerates are substantially divided into their individual particles and the wettable pigment surface area is thus increased. With a constant proportion of dispersant and/or stabilizer, the dispersant and/or stabilizer adsorption layer thus becomes thinner with increasing degree of division, with the result that the elastic deformation of the adsorption layers, which is necessary for steric stabilization, is no longer guaranteed and the elastic entropic and osmotic repulsion effects are no longer sufficiently effective. The result is a tendency toward latent dispersion stability, which trend, depending on the type of magnetic pigment, its BET specific surface area and its surface treatment, is low or pronounced and which is evident from flocculation and consequent loss of the recording properties of the recording media produced therefrom.

On the basis of this knowledge, it is obvious that the dispersant and/or stabilizer adsorption layer required for steric stability could be compensated by increasing the proportion of dispersant and/or stabilizer. However, by increasing the proportion of the dispersant and/or stabilizer, the mechanical properties, for example the still life in the case of video tapes or the abrasion resistance in the case of audio and computer tapes, are adversely affected. Furthermore, such magnetic tapes having an increased proportion of dispersant and/or stabilizer tend to exhibit exudation and sticking, in particular at elevated temperatures and high atmospheric humidity.

It is an object of the present invention to provide a process in which the known effective dispersing units are used and homogeneous and stable dispersions can nevertheless be prepared without increasing the proportion of dispersant and/or stabilizer, with the result that a substantial improvement in the magnetic properties and hence in the recording properties of the resulting magnetic recording media is achieved.

We have found that this object is achieved by a process for the production of magnetic recording media by dispersing finely divided, magnetic material in a mixture of solvents, organic polymer binders, dispersants and further additives, applying the dispersion as a layer to a substrate and subsequently consolidating the layer, if the dispersion is prepared in a stirred ball mill which contains grinding media having a diameter of from 0.2 to 3.0 mm and a density of from 3.6 to 3.9 g/cm$^3$ and is then aftertreated in a ball mill containing grinding media having a diameter of more than 2.0 mm and a density greater than 4.2 g/cm$^3$, and the viscosity of the resulting dispersion, measured at 25° C., is not less than 50 mPa.s, with the proviso that the finely divided, magnetic material used has a BET surface area of not less than 14 m$^2$/g.

The preparation of the dispersion by the novel process is carried out by a procedure in which the magnetic material, the dispersant, the solvent and the dissolved binder and any further additives are introduced into the stirred ball mill, which usually contains spherical grinding media, preferably consisting of from 60 to 80% by weight of $ZrO_2$ and from 20 to 40% by weight of $SiO_2$, in particular consisting of 69% of zirconium oxide and 31% of silica and having a diameter of from 0.2 to 3.0 mm, preferably from 0.6 to 2.0 mm and a density from 3.6 to 3.9 g/cm$^3$. For satisfactory processing of the dispersion, it is appropriate if the dispersion has a viscosity of not less than 100, in particular up to 600, mPa.s (measured at 25° C.).

As soon as the pigment agglomerates have been virtually completely divided into the individual particles and the required degree of dispersion has thus been achieved, the magnetic dispersion, directly after reaching a stable form, is aftertreated for not less than 10 minutes, preferably from 2 to 24 hours, in a ball mill which contains spherical grinding media of steel or a corresponding metal alloy and having a density of not less than 4.2, in particular 7.8, g/cm$^3$ and a diameter of more than 2 mm, advantageously from 2 to 10 mm, in particular from 4 to 6 mm, until the dispersion no longer changes in its degree of division and hence remains stable in this form, even on storage.

The composition of the dispersion used in the novel process for the production of magnetic recording media otherwise corresponds to the prior art. Preferably used magnetic materials are finely divided acicular gamma-iron(III) oxide having a mean particle size of from 0.1 to 2 μm, in particular from 0.1 to 0.9 μm, or acicular chromium dioxide having the same particle structure as stated for iron oxide. Other suitable materials are gamma-iron(III) oxide doped with heavy metals, in particular cobalt, finely divided metal alloys of iron, cobalt and/or nickel, and suitable ferrite materials. Magnetic materials which are very finely divided and in particular have a BET specific surface area of not less than 14, preferably not less than 26, m$^2$/g are preferred.

Suitable binders for dispersing the finely divided magnetic material are the binders known for the production of magnetic layers, for example a copolyamide which is soluble in conventional solvents, a polyvinylformal, a polyurethane elastomer, mixtures of polyisocyanates and relatively high molecular weight polyhydroxy compounds or vinyl chloride copolymers containing more than 60% of vinyl chloride molecular building blocks, for example a vinyl chloride copolymer with one or more comonomers, such as a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers or hydroxyl-containing vinyl chloride copolymers, which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate. Other suitable binders are mixtures of one or more polyurethane elastomers with polyvinylformals, phenoxy resins and vinyl chloride copolymers of the composition stated above. Preferably used polyurethane elastomer binders are commercial elastomeric polyurethanes of adipic acid, butane-1,4-diol and 4,4-diisocyanatodiphenylmethane. OH-containing polyureaurethane binders which are crosslinked with polyisocyanate and where the OH-containing polyureaurethane is obtained by reacting a polydiol, a diol or a primary or secondary aminoalcohol and, if required, a triol with a diisocyanate are also advantageous.

Magnetic dispersions which are particularly suitable for the production of rigid magnetic recording disks preferably contain, as binders, epoxy resins, phenoxy resins, aminoplast precondensates, polyester resins, polyurethanes or polyurethane formers and mixtures of such binders with one another and with other binders, such as polycarbonates or vinyl polymers, for example vinyl chloride copolymers or vinylidene chloride copolymers or heat-curable acrylate or methacrylate copolymers.

Further additives for the production of magnetic layers, for example small amounts of monocarboxylic acids, mixtures or esters thereof and fillers, such as carbon black, graphite, quartz powder, nonmagnetic α-Fe$_2$O$_3$ and/or powders based on silicates, and leveling agents, such as small amounts of silicone oil, may be added to the dispersions. Advantageously, these additives should not exceed a total of 12, preferably 8, % by weight, based on the magnetic material.

The magnetic dispersion is applied to the non-magnetic substrate with the aid of conventional coating apparatuses, for example by means of a knife coater. The conventional substrate materials can be used as non-magnetic and nonmagnetizable substrates, in particular films of linear polyesters, such as polyethylene terephthalate, in general in thicknesses of from 1 to 200 μm, in particular from 6 to 36 μm. Before the still liquid coating mixture is dried on the substrate, which is advantageously effected at from 50° to 90° C. in the course of from 10 to 200 seconds, the anisotropic magnetic particles are oriented along the intended recording direction, if necessary by the action of a magnetic field. The magnetic layers can then be calendered and compacted on conventional machines by being passed between heated and polished rollers. The thickness of the magnetic layer is in general from 0.5 to 10 μm.

Surprisingly, in particular extremely finely divided, highly stable magnetic dispersions, as required for magnetic recording media having an extremely high maximum output level and a very high signal-to-noise ratio, can be produced in a simple economical manner by the novel process. Particularly in the case of magnetic recording media for video recording, good magnetic properties, small particle size, substantially uniform particle size distribution and homogeneous coat structure are required for ensuring high quality. It is precisely these property profiles, which are generally contradictory, which can be obtained in a particularly advantageous manner by the novel process.

The Examples which follow illustrate the invention and are compared with prior art experiments.

EXAMPLE 1

80 parts of an acicular magnetic chromium dioxide powder having a mean particle length of 0.6 μm and a BET specific surface area of from 26 to 27 m$^2$/g and a coercive force of 48 kA/m and 20 parts of an acicular, magnetic iron powder having a mean particle length of 0.7 μm, a BET specific surface area of 26 m$^2$/g and a coercive force of 50 kA/m were dispersed in 36.8 parts of a 50% strength solution of a thermoplastic, low molecular weight, polyfunctional, polyurethane in a mixture of equal amounts of tetrahydrofuran and dioxane, 23.0 parts of a 16.5% strength solution of a polyvinylformal, consisting of 82% of vinylformal units, 12% of vinyl acetate units and 6% of vinyl alcohol units, having a K value of 50 (1% in dimethylformamide), in the abovementioned solvent mixture, 1.0 part of methyl stearate, 0.5 part of stearic acid and 1.7 parts of zinc oleate, in a stirred ball mill having a capacity of 1,000 parts by volume and containing from 700 to 750 parts by volume of balls consisting of 69% of ZrO$_2$ and 31% of SiO$_2$ and having a diameter of from 0.6 to 1.5 mm, in the course of 28 hours. Thereafter, 600 parts of this magnetic dispersion were aftertreated in a ball mill having a capacity of 1,000 parts by volume and containing 300 parts by volume of steel balls having a diameter of from 4 to 6 mm, in the course of 8 hours. After the end of the finish process, the magnetic dispersion was filtered, 12.6 parts of a 50% strength solution of a triisocyanate, prepared from 3 moles of toluylene diisocyanate and 1 mole of 1,1,1-trimethylolpropane in tetrahydrofuran, were added and stirring was carried out for 15 minutes. The dispersion was filtered and was then applied as a layer to a 16 μm thick polyethylene terephthalate film with simultaneous orientation of the magnetic particles by means of a permanent magnet. The magnetic layer, which was 3 μm thick after drying, was calendered by being passed between heated rollers under pressure, and the coated film web was slit into ½" wide tapes.

COMPARATIVE EXPERIMENT 1

The procedure described in Example 1 was followed, except that the finish process carried out in the ball mill after dispersing was dispensed with.

COMPARATIVE EXPERIMENT 2

The procedure described in Example 1 was followed, except that 2.3 parts of zinc oleate were added and the subsequent finish process in the ball mill was dispensed with.

COMPARATIVE EXPERIMENT 3

The procedure described in Example 1 was followed, except that 0.3 part of a reaction product of polycaprolactone and polyimide was also added and the subsequent finish process in the ball mill was dispensed with.

The magnetic recording media resulting from Example 1 and from the Comparative Experiments 1 to 3 were subjected to the measurements described below. The results are shown in Table 1.

1. Gloss measurement using a type RB 3 reflectometer from Lange, angle of incidence 60°.
   Gloss A: The dispersion was coated immediately after the dispersing and finish process. The gloss measurement was carried out on the unsatinized piece of tape.
   Gloss B: The ready-prepared dispersion was stored for 3 hours in a storage container and was subjected to gentle shearing, after which it was applied as a layer and the gloss of the unsatinized piece of tape was measured.
2. The average peak-to-valley height $R_z$ was measured using an SSP perthometer from Feinprüf, Göttingen. The test peak radius was 2.5 μm, the cut-off was 0.25 mm and the measuring distance was 4.8 mm transverse to the casting direction.
3. JFK distance measured using interference contrast white-light unit according to EP-A 2710.
4. The FSM measurement serves for evaluation of the color quality of the recorded video information. A characteristic frequency of the video signal was analyzed and was compared with the video signal recorded on a reference tape.
5. In the dropout measurement, the recorded video signal was analyzed during playback. A dropout 1 (DO 1) is a signal loss having a drop in output level greater than 14 dB and a duration greater than 15 μs. A dropout 2 (DO 2) is a signal loss having a drop in output level greater than 14 dB and a duration greater than 5 μs.

TABLE 1

|  | Example | Comparative Experiments | | |
|---|---|---|---|---|
|  | 1 | 1 | 2 | 3 |
| Gloss A (scale div.) | 80–95 | 80–90 | 80–90 | 80–95 |
| Gloss B (scale div.) | 80–95 | 10–30 | 20–40 | 80–90 |
| Average peak-to- | 30–45 | 40–100 | 40–80 | 30–45 |

TABLE 1-continued

|  | Example | Comparative Experiments | | |
|---|---|---|---|---|
|  | 1 | 1 | 2 | 3 |
| valley height $R_z$ (nm) |  | — | — | — |
| JFK distance (nm) | 40–50 | — | — | — |
| FSM (dB) | −2 | −7 | −7 | — |
| DO 1 | 6–9 | 25–35 | 25–35 | — |
| DO 2 | 12–18 | 60–80 | 60–80 | — |

In Comparative Experiment 2, a greater increase in dropouts was found after storage. This is due to the overdose of the dispersant.

In Comparative Experiment 3, deposits due to exudation of the stated reaction product were found on the calender rolls during calendering itself. The experiment was therefore terminated.

EXAMPLE 2

85 parts of an acicular magnetic iron powder having a mean particle size of 0.7 μm and a BET specific surface area of 26 m²/g and a coercive force of 48 kA/m and 15 parts of an acicular, magnetic chromium dioxide powder having a mean particle length of 0.6 μm, a BET specific surface area of from 26 to 28 m²/g and a coercive force of 40 kA/m were dispersed with 10 parts of a spherical alumina powder having a mean particle diameter of 0.6 μm in a binder mixture of 69.8 parts of a 12.8% strength solution of a thermoplastic polyester urethane of adipic acid, butane-1,4-diol and 4,4'-diisocyanatodiphenylmethane, 29.1 parts of a 30% strength solution of a straight-chain polyester, 74.8 parts of a 10% strength solution of a polyvinylformal, consisting of 82% of vinylformal units, 12% of vinyl acetate units and 6% of vinyl alcohol units, having a K value of 50 (1% in dimethylformamide), and 62.8 parts of a nitrocellulose solution in a mixture of equal amounts of tetrahydrofuran and dioxane, a further 43.7 parts of tetrahydrofuran and 281.4 parts of dioxane and one part of an added dispersant based on an N-tallow fatty-1,3-diaminodioleate, 8.0 parts of butoxyethyl stearate, 2.0 parts of myristic acid and 0.1 part of silicone oil, in a stirred ball mill having a capacity of 1,000 parts by volume and containing from 700 to 750 parts by volume of balls consisting of 69% of ZrO₂ and 31% of SiO₂ and having a diameter of from 0.6 to 1.5 mm. Thereafter, 700 parts of this magnetic dispersion were aftertreated in a ball mill having a capacity of 1,000 parts by volume and containing 300 parts by volume of steel balls having a diameter of from 4 to 6 mm, in the course of 3 hours. After the end of the finish process, the magnetic dispersion was filtered, 4.1 parts of a 50% strength solution of a triisocyanate, prepared from 3 moles of toluylene diisocyanate and 1 mole of 1,1,1-trimethylolpropane, in tetrahydrofuran were added and thorough stirring was carried out for 20 minutes. The dispersion was filtered and then applied as a layer to both sides of a 75 μm thick polyethylene terephthalate film with simultaneous orientation of the magnetic particles by means of a permanent magnet. The magnetic layer, which was 1.2 μm thick after drying, was calendered by being passed between heated rollers under pressure, and circular disks having a diameter of 3.5" were punched from the film web coated on both sides. The measurements were carried out as stated in Example 1. The results are shown in Table 2.

COMPARATIVE EXPERIMENT 4

The procedure described in Example 2 was followed, except that the finish process after dispersing was dispensed with. The results are shown in Table 2.

COMPARATIVE EXPERIMENT 5

The procedure described in Example 2 was followed, except that, instead of 1.0 part, 1.5 parts of the dispersant based on an N-tallow fatty-1,3-diaminodioleate were added and the subsequent finish process was dispensed with. The results are shown in Table 2.

TABLE 2

|  | Example 2 | Comparative Experiments 4 | Comparative Experiments 5 |
| --- | --- | --- | --- |
| Gloss B unsatinized (scale div.) | 42 | 25 | 30 |
| Gloss B satinized (scale div.) | 86 | 68 | 72 |
| $R_z$ satinized ($\mu m$) | 0.20 | 0.38 | 0.34 |
| Overwrite according to ECMA standard (%) (ideal value greater than 90%) | 99 | 81 | 84 |

We claim:

1. A process for the production of a magnetic recording medium, which comprises combining magnetic material having a particle size of 0.1-2 $\mu m$ and a BET surface area of not less than 14 $m_2/g$ in a mixture comprising at least one solvent, at least one organic polymer binder, at least one dispersant, but being substantially free of abrasive particles to produce a first dispersion; grinding the first dispersion in a first stirred ball mill, which ball mill contains grinding media having a diameter of 0.2-3.0 mm and a density of 3.6-3.9 $g/cm_3$ to form a second dispersion, treating the second dispersion in a ball mill containing grinding media having a diameter of more than 2.0 mm and a density greater than 4.2 $g/cm_3$ to prepare a third dispersion, which dispersion has a viscosity, measured at 25° C., of not less than 50 mPa.s; applying the third dispersion as a layer to a substrate; and reducing the liquid content of the layer to produce a magnetic recording medium.

2. A process as claimed in claim 1, wherein the second dispersion is prepared in first stirred ball mill which contains spherical grinding media composed of from 60 to 80% by weight of $ZrO_2$ and from 20 to 40% by weight of $SiO_2$ and having a mean diameter of from 0.6 to 2.0 mm.

3. The process of claim 1 wherein the third dispersion is prepared in a second ball mill which contains spherical grinding media consisting of a metal alloy and having a means diameter of 2-10 mm.

4. The process of claim 3 wherein the metal alloy is steel.

* * * * *

UNITED STATES PATENT AND TRADEMARK OFFICE
CERTIFICATE OF CORRECTION

PATENT NO. : 5,085,889
DATED : February 4, 1992
INVENTOR(S) : Horst Platz, et. al.

It is certified that error appears in the above-indentified patent and that said Letters Patent is hereby corrected as shown below:

<u>Claim 1, Col. 7, Line 29</u>

That part reading "$14m_2/g$" should read --$14m^2/g$--

<u>Claim 1, Col. 8, Line 6</u>

That part reading "$3.6-3.9g/cm_3$" should read --$3.6-3.9g/cm^3$--

<u>Claim 1, Col. 8, Line 9</u>

That part reading "$4.2g/cm_3$" should read --$4.2g/cm^3$--

<u>Claim 3, Col. 8, Line 26</u>

"means" should read --mean--

Signed and Sealed this

Twenty-eighth Day of September, 1993

Attest:

BRUCE LEHMAN

Attesting Officer     Commissioner of Patents and Trademarks